United States Patent Office 3,560,574
Patented Feb. 2, 1971

3,560,574
PROCESS FOR THE PREPARATION OF
OXYALCOHOLS AND OXYKETONES
Orville D. Frampton, Julian Feldman, and Charles E. Frank, Cincinnati, Ohio, assignors to National Distillers and Chemical Corporation, New York, N.Y.
No Drawing. Filed Jan. 8, 1969, Ser. No. 789,938
Int. Cl. C07c 43/04, 43/20, 43/18
U.S. Cl. 260—615      7 Claims

ABSTRACT OF THE DISCLOSURE

A process is provided for the preparation of oxyalcohols and oxyketones by the trihydrocarbyl phosphine-catalyzed reaction of epoxides and monohydric alcohols.

This invention relates to a process for the preparation of oxyalcohols and oxyketones by the reaction of epoxides and monohydric alcohols in the presence of a trihydrocarbyl phosphine catalyst, and more particularly to the preparation of aliphatic oxyalcohols and oxyketones by the reaction of oxiranes and aliphatic monohydric alcohols in the presence of tributyl phosphine as a catalyst.

A number of oxyalcohols are available commercially; these are principally polyoxyalkylene glycols, such as di-, tri-, tetra- and higher polyoxyethylene glycols. Methoxy polyoxyalkylene glycol monoethers are marketed under the tradename Carbowax. Ethylene glycol monoethyl ether (Cellosolve), diethylene glycol monoethyl ether (Carbitol), ethylene glycol monomethyl ether (methyl Cellosolve), diethylene glycol monomethyl ether (methyl Carbitol), ethylene glycol monobutyl ether (butyl Cellosolve) and diethylene glycol monobutyl ether (butyl Carbitol) are prepared by the thermal reaction of methyl, ethyl or butyl alcohol (in excess) and ethylene oxide at 150° C. under 250 pounds pressure for a reaction time of approximately twelve hours. A mixture of products are obtained, which are separated by fractional distillation. Ethylene glycol monoethyl ether (Cellosolve) is obtained in a 70% yield, and the monoethyl ether of diethylene glycol, Carbitol, is obtained as a by-product, together with other even higher molecular weight oxyalcohol ethers. The process is described in U.S. Pat. No. 1,696,-874, issued Dec. 25, 1928, to Young.

In accordance with the invention, a process is provided whereby the monoalkyl ethers of polyoxyethylene glycols and higher molecular weight oxyalcohols can be obtained in shorter reaction times at lower reaction temperatures, and in higher yields. The alcohol need not be used in excess. By this process it is possible to prepare oxyalcohols havings a variety of structures including aliphatic, aromatic, cycloaliphatic and heterocyclic groups, both as terminal ether groups, and as linking bivalent groups in the oxyalcohol ether chain. If the epoxide has a substituent on one of the oxirane carbon atoms, oxyketones can also be obtained, as a valuable by-product, by dehydrogenation of the oxyalcohol.

The term "oxyalcohol" as used herein encompasses alcohols having one hydroxyl group and one or a plurality of oxyether groups linked by the bivalent organic residue of the epoxide, with the organic group of the alcohol as a terminal group of the oxyalcohol molecule or chain. The oxyketones are derived from such oxyalcohols having a secondary alcohol group by dehydrogenation of the group to form a

The oxyalcohols are prepared by condensation of an oxirane or epoxide and the corresponding monohydric alcohol in the presence of a trihydrocarbyl phosphine catalyst. Normally, the preferred catalyst is a trialkyl phosphine. The reaction proceeds even at room temperature, and is quite straightforward, with the relative proportions of low molecular weight and high molecular weight oxyalcohols dependent upon the relative proportions of alcohol and oxirane or epoxide.

It is believed that the trihydrocarbyl phosphine catalyst, acting as a base, forms an adduct with the oxirane or epoxide, and this adduct then adds additional oxirane or epoxide units until reaction is terminated by reaction with monohydric alcohol, forming a terminal ether group which blocks further chain growth. The reaction thus can be represented by the following scheme:

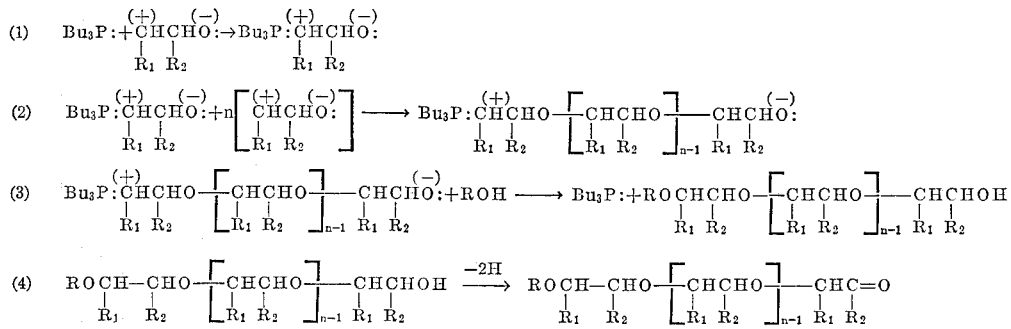

In the above reaction scheme, R₁ and R₂ are hydrogen or an organic radical, which can include inert substituents. If R₂ is an organic radical, then reaction (4) results in a ketone as a by-product.

Tributyl phosphine is shown as illustrative, and in fact it is preferred, but it will be understood that many trihydrocarbyl phosphines will serve as catalysts. Thus, the catalyst can be defined by the general formula R₁R₂R₃, in which R₁, R₂ and R₃ are hydrocarbon radicals selected from the group consisting of alkyl, cycloalkyl and aryl, and having from one to about twelve carbon atoms. The hydrocarbon radicals can be the same or different. There is no critical upper limit on the number of carbon atoms in the hydrocarbon radicals, but as the number of carbon atoms in the radical increases, the basicity of the phosphine decreases, and with it the activity of the phosphine as a catalyst. Accordingly, it is preferred for maximum activity that the catalyst have hydrocarbon radicals of from about one to about six carbon atoms, and that the total number of carbon atoms in the phosphine not exceed about fifteen. Phosphines having short-chain alkyl groups tend to be highly volatile, and when such phosphines are employed, such as for instance, trimethyl phosphine, it may be necessary to carry out the reaction under pressure.

Consequently, it is usually preferred that the phosphine be a liquid at the reaction temperature, so as to avoid loss of catalyst in the course of the reaction, and avoid the necessity of carrying out the reaction under pressure.

Oxygen appears to inactivate the catalyst, and deter the reaction from proceeding in the desired manner. Consequently, it is preferred that the reaction be carried out under an inert atmosphere. As the inert atmosphere, any gas that is nonreactive with alcohol and epoxide or oxirane and the trialkyl phosphine under the reaction conditions can be employed. Nitrogen, argon, heilum, methane, butane and propane can be employed. Carbon monoxide also can be used, under certain conditions.

As the catalyst, there can be employed, for example, trimethyl phosphine, methyl di-n-butyl phosphine, tri-n-butyl phosphine, triisobutyl phosphine, tri-tert-butyl phosphine, trisecondarybutyl phosphine, triethyl phosphine, isopropyl diamyl phosphine, trihexyl phosphine, triodecyl phosphine, isoamyl dibutyl phosphine, isohexyl diethyl phosphine, tri-2-ethyl phosphine, triisopropyl phosphine, and di-n-propyl methyl phosphine, tricyclohexyl phosphine, methyl dicyclohexyl phosphine, diethyl-cycloexyl phosphine, triphenyl phospine, methyl diphenyl phosphine, dimethylphenyl phosphine, cyclohexyldiphenyl phosphine, dicyclohexylphenyl phosphine, ethylcyclopentyl phenethyl phosphine, butylcyclohexyl tolyl phosphine, and ethylcyclopentyl xylyl phosphine.

The reaction proceeds in the presence of very small amounts of catalyst, which can be recovered unchanged from the reaction product. As little as 0.025% trihydrocarbyl phosphine by weight of the reaction mixture will give an effective reaction. Amounts within the range from about 1 to about 5% are preferred. Amounts of catalyst as high as 10% can be used, but usually amounts in excess of 5% do not give a corresponding increase in reaction rate, and therefore can be wasteful.

The reaction proceeds at room temperature (25° C.) at a satisfactory rate. However, for maximum yield in a short time, it is usually preferred that the reaction be carried out at a temperature within the range from about 50 to about 100° C. There is no critical upper limit on reaction temperature, other than that imposed by the decomposition temperature of the oxyalochol that is produced, and the volatility of the reactants and reaction products. At high reaction temperatures, one or more of these components can be volatile, and this will necessitate carrying out the reaction in a closed vessel, under pressure, so as to maintain the volatile reactants in the liquid phase. If these are not disadvantages, reaction temperatures up to 150° C. and frequently as high as 250° C. can be employed.

In addition to temperature, control of the rate of reaction can be obtained by blending the reactants with an inert diluent. As the inert diluent, any organic solvent that is a liquid and inert under the reaction conditions can be employed. Suitable solvents include dimethylsulfoxide; halogenated hydrocarbons, such as carbon tetrachloride, chloroform, trichloroethane, ethyl chloride and perchloroethylene; aliphatic, cycloaliphatic and aromatic hydrocarbons, such as decane, nonane, octane, heptane, hexane, pentane, the petroleum ethers, benzene, xylene, toluene, mesitylene, cyclohexane, cyclopentane and cycloheptane, nitriles, such as acetonitrile, propionitrile, and benzonitrile, and aliphatic ethers, such as propyl ether, butyl ether and dimethylcellosolve, and formamide, dimethylformamide, and tetramethylurea. In some cases, it is also possible to employ cyclic ethers, such as 1,4-dioxane, tetrahydrofuran, and morpholine.

The monohydric alcohol that is employed as a chain stopper in the reaction can be any monohydric alcohol that is aliphatic, aromatic, cycloaliphatic, or heterocyclic, or mixed aliphatic-aromatic, aliphatic-cycloaliphatic, cycloaliphatic-aromatic, aliphatic-heterocyclic, aromatic-heterocyclic or cycloaliphatic-heterocyclic. Among the alcohols that can be employed there can be mentioned ethyl alcohol, methyl alcohol, isopropyl alcohol, n-butyl alcohol, n-propyl alcohol, isobutyl alcohol, tert-butyl alcohol, sec-butyl alcohol, amyl alcohol, isoamyl alcohol, heptyl alcohol, hexyl alcohol, decyl alcohol, dodecyl alcohol and stearyl alcohol; benzyl alcohol, alpha-phenethyl alcohol, beta-phenethyl alcohol, and alpha-phenpropyl alcohol; allyl alcohol, crotyl alcohol, butenyl alcohol, pentenyl alcohol, oleyl alcohol, ricinoleyl alcohol, linoleyl alcohol, and linolenyl alcohol; cyclohexyl alcohol, cyclopentyl alcohol, and cycloheptyl alcohol; tetrahydrofurfuryl alcohol, and furfuryl alcohol.

The reaction will proceed with alcohols containing inert substituents, including amine groups, nitrile groups, halogen, and ester groups, such as for example, monoethanolamine, diethanolamine, triethanolamine, glycollonitrile, methyl lactate, trimethyl citrate, diethyl malate, and butyl lactate.

In general, the alcohol can have from one to about twenty-four carbon atoms, but there is no critical upper limit on the number of carbon atoms of the alcohol, and alcohols having as many as fifty carbon atoms will also undergo the reaction.

The epoxide also can be aliphatic, aromatic, cycloaliphatic, or heterocyclic, or mixed aliphatic-aromatic, aliphatic-cycloaliphatic, aliphatic-heterocyclic, aromatic-heterocyclic, cycloaliphatic-heterocyclic, or cycloaliphatic-aromatic in nature. The invention is of particular application to 1,2-epoxides, which are the most reactive, but 1,3-epoxides also undergo the reaction, and in some circumstances 1,4-epoxides also undergo the reaction, although these epoxides are considerably less active than the 1,2- or 1,3-epoxides.

Typical epoxides include ethylene oxide, 1,2-propylene oxide, 1,3-propylene oxide, 1,2-butylene oxide, 1,3-butylene oxide, 1,4-butylene oxide, 2,3-butylene oxide, 1,2-isobutylene oxide, 1,2-amylene oxide, 2,3-amylene oxide, 1,3-amylene oxide, 1,4-amylene oxide, 2,4-amylene oxide, 1,2-hexylene oxide, dipentene dioxide, and 3,4-hexylene oxide; styrene oxide; dicyclopentadiene dioxide, vinylcyclohexene dioxide, vinylcyclohexeneoxide, cyclohexene oxide, and cycloheptene oxide. The epoxides also can contain inert substituents, such as amine, nitrile, halogen, and ester groups, for instance, methyl-9,10-epoxystearate, bromoethylene oxide, cyanoethylene oxide, 1,2-epoxyethyl - propionate, 3,4-epoxy-cyclohexane carbonitrile, methyl glucoside, and allyl-9,10-epoxy stearate.

The epoxide can have from one to about twenty-four carbon atoms, but there is no critical upper limit on the number of carbon atoms of the epoxide, and epoxides having as many as fifty carbon atoms will also undergo the reaction. While monoepoxides are preferred, di- and tri-epoxides also can be used.

The process can be carried out by mixing the epoxide or oxirane and the alcohol under an inert atmosphere in a reaction vessel. The trihydrocarbyl phosphine is then added. If desired, an inert diluent can be included. The components are mixed under an inert atmosphere, and the mixture is then brought to the reaction temperature if necessary, and reaction continued until formation of the oxyalcohol has been effected. The reaction time will depend upon the temperature employed, and is inversely proportional to the temperature. In general, reaction times of from about fifteen minutes to about thirty-six hours are sufficient, although several days or weeks may be required for reactions at room temperature. The reaction normally is complete within less than three hours, when carried out at from 50 to 150° C. or above.

The alcohol and the epoxide or oxirane condense to form a mixture of polyoxy monohydroxy alcohols whose molecular weights depend upon the relative proportions of epoxide and alcohol. High epoxide concentrations relative to alcohol tend to give high molecular weight oxyalcohols, whereas high alcohol concentrations relative to epoxide tend to give low molecular weight oxyalcohols. The number of moles of epoxide and alcohol in the oxyalcohol product will depend upon the relative number of moles of these components used as starting materials.

In general, the molar ratio of epoxide or oxirane to alcohol is within the range from about 0.1:1 to about 10:1. The preferred range is from about 0.5:1 to about 5:1. Very high molecular weight compounds are obtainable, using a ratio of epoxide to alcohol of about 10:1, and a high reaction temperature of from about 150 to about 200° C., with a long reaction time, of from twelve to twenty-four hours. These products are similar to the high molecular weight polyoxyethylene glycols of industry having a monoether terminal group. Such compounds are useful as lubricants, binders, humectants and solvents for waxes, gums, starches and like materials. Low molecular weight products are obtained using a ratio of epoxide to alcohol of about 0.1:1, low reaction temperatures, of from 25 to 150° C., and a short reaction time, of less than five hours.

A reaction mixture containing four moles of epoxide to one mole of alcohol will normally contain up to four epoxy units per alcohol unit, and will therefore be a tetraoxy monohydric alcohol ether, with a certain proportion of the lower tri-, di- and monoxy ethers with monohydric alcohol. A reaction mixture of three moles of epoxide to each mole of alcohol will usually form primarily a trioxy monohydric alcohol ether, with minor proportions of the corresponding di- and monooxy monohydric alcohols.

At the conclusion of the reaction, the reaction mixture can be subjected to fractional distillation in order to separate the various oxyalcohol components of differing molecular weights. The boiling points of these oxyalcohol ethers are usually sharply differentiated, and a good separation can be obtained. It will not be necessary to separate the components for many uses, however, such as, for instance, when the products are used in hydraulic brake fluids, lacquers, dye solvents, printing pastes, surfactants, and mold release agents, as well as other uses. In such uses, mixtures of components are readily tolerated. If the products are used as intermediates in the formation of other compounds of specific structure, however, it may be necessary to effect a sharp separation. Inasmuch as the oxyalcohols of the invention are known compounds, this is easily done, using known techniques.

The following examples in the opinion of the inventors represent preferred embodiments of the invention.

EXAMPLE 1

Styrene oxide (80 ml.), 16 cc. of ethanol and 4 cc. of tributyl phosphine were mixed under nitrogen, and then reacted at room temperature (26° C.) for six days. The reaction mixture was then divided into several parts. One part was heated at 70 to 78° C. for 40 minutes, and then at 57–59° C. for 3½ hours. The remainder was heated at 50 to 85° C. for 8 hours. The various portions of the reaction mixtures were then worked up in order to separate and identify the reaction products.

The reaction mixture obtained at the end of six days of standing at 26° C. was analyzed by gas liquid chromatography on an 8 foot x ¼ inch silicone rubber on Chromosorb W column at 250° C., using helium carrier gas, at a flow rate of 100 cc./min., and a retention time of 16.5 minutes. Based on the area under the gas liquid chromatographic curve, the ratio of diphenyl Carbitol formed to catalyst was 1.9, corresponding to a conversion of 47% of theory, based on ethanol.

The reaction mixture obtained after heating this product for an additional 40 minutes at 70 to 78° C. was then analyzed using the same technique. An increase in the ratio to 3.2 was noted, corresponding to a conversion of 80% of theory. The additional heating at 57 to 59° C. for 3½ hours gave a further increase in the ratio, to 3.5, or 88% of theory.

A control run without tributyl phosphine, using 40 cc. styrene oxide and 8 cc. alcohol heated at 70–89° C. for 8½ hours gave no reaction; no diphenyl Carbitol was detected by the gas liquid chromatographic analysis technique described above. This shows the importance of the catalyst in this reaction.

The diphenyl Carbitol fraction was separated by distillation under vacuum. The fraction boiled at 155 to 173° C. under 3 mm. mercury, and had a refractive index at 25° C. of 1.53808. The diphenyl Carbitol fraction was isolated from the distillate by gas liquid chromatography, and was distinguished by gas liquid chromatographic analysis from 2,4-diphenyl dioxane, 2-benzyl-4-phenyl-1,3-dioxolane, and β-ethoxy-α-phenylethyl alcohol, showing that none of these products (which might also have been formed) were in fact formed.

It accordingly appears from the above that the reaction that took place was as follows:

(I) Diphenyl carbitol

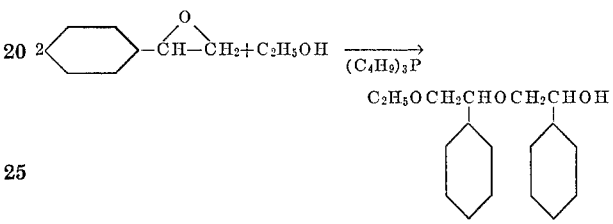

(II) Ketone oxidation product

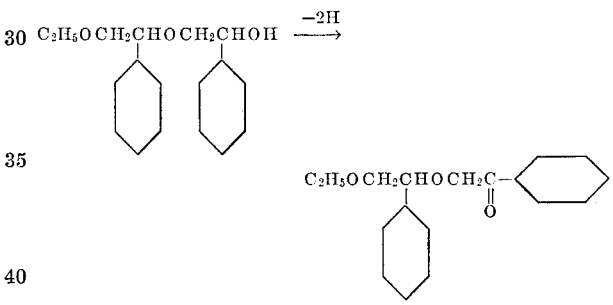

The structures I and II above are supported by the following evidence:

Diphenyl Carbitol I (a) *Elemental analyses.* Found (percent): C, 74.77; H, 7.64; O, 17.53. Calculated (percent): C, 75.52; H, 7.69; O, 16.78.

(b) Mass spectrum: fragment with m/e of 227 is

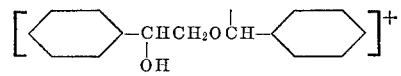

(c) Infrared spectrum: functions present include aliphatic ether, alcohol and CH, and monosubstituted aromatics.

Ketone oxidation product II

The ketone was also separated from the Carbitol distillate fraction by gas liquid chromatography, but contained some $(C_4H_9)_3P$ impurity.

(a) Mass spectrum: fragment with m/e 225 is

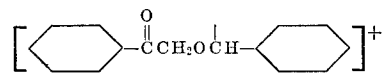

The cracking pattern is similar to that of I, however

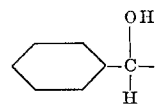

is unlikely.

(b) Infrared spectrum: aliphatic ether, monosubstituted aromatic, some >C=O. $CH_3$ region is similar to that of compound I.

EXAMPLE 2

A solution composed of 8 cc. styrene oxide, 16 cc. isopropanol and 1 cc. tributyl phosphine was allowed to react at 25° C. for twenty-four hours. Gas liquid chromatographic analysis showed the presence of a compound in a concentration of about 5% theoretical, and having a retention time close to but different from that of diphenyl Carbitol. The mixture was then allowed to react a further thirty days at 25° C. An 8 foot by ¼ inch column of silicone rubber on firebrick at 230° C. was used in the isolation procedure by gas liquid chromatography. The reactions resulting in the two compounds isolated were as follows:

$$2\,C_6H_5\text{-}CH\text{-}CH_2 + \underset{CH_3}{\underset{|}{CHOH}}\underset{CH_3}{\underset{|}{}} \xrightarrow{(C_4H_9)_3P}$$

$$\underset{CH_3}{\underset{|}{CHOCH_2CHOCH_2CHOH}}\underset{CH_3}{\underset{|}{}}\;(C_6H_5)(C_6H_5) \quad \text{III}$$

$$\underset{CH_3}{\underset{|}{CHOCH_2CHOCH_2CHOH}}\underset{CH_3}{\underset{|}{}}\;(C_6H_5)(C_6H_5) \xrightarrow{-2H}$$

$$\underset{CH_3}{\underset{|}{CHOCH_2CHOCH_2C\text{-}C_6H_5}}\underset{CH_3}{\underset{|}{}}\;(C_6H_5)\overset{\parallel}{O} \quad \text{IV}$$

The structure of the first compound is supported by the following evidence:

(a) Mass spectrum: fragment with m/e of 227 is $$\left[ C_6H_5\text{-}\underset{OH}{\underset{|}{CHCH_2O}}CH\text{-}C_6H_5 \right]^+$$

(b) Infrared spectrum: functions present include aliphatic secondary OH, aliphatic ether and monosubstituted aromatic. There is more aliphatic CH than in structure I, and the aliphatic CH is different in the CH$_2$ reigon.

(c) NMR spectrum:

| Fragment | Protons |
|---|---|
| —CH$_3$ | 6 |
| C$_6$H$_5$— | 10 |
| —CH$_2$O— | |
| >CHO— | 5 |
| —O—C—H (phenyl) | 2 |
| —OH | 1 |

The structure of the second compound is supported by the following evidence:

(a) Mass spectrum: fragment with m/e of 225 is $$\left[ C_6H_5\text{-}\overset{O}{\overset{\parallel}{C}}CH_2O\overset{|}{C}H\text{-}C_6H_5 \right]^+$$

(b) Infrared spectrum: aliphatic ether and monosubstituted aromatic, aliphatic OH, aliphatic >C=O.

Note: More >C=O relative to aliphatic OH than in sample containing structure III. Thus there may be some III present in the sample.

EXAMPLE 3

A solution composed of 5 cc. of ethylene oxide, 2.5 cc. of ethanol, and 0.4 cc. of tributyl phosphine was placed in a 10 ml. stainless steel microreactor at about +70° C.. for 3 hours. Gas liquid chromatographic analysis showed the presence of both Cellosolve and Carbitol. The mixture was separated by gas liquid chromatography on the silicone rubber column at a programmed temperature ranging from 100 to 190° C. Five components identified as Cellosolve, Carbitol, monoethyl triethylene glycol, monoethyl tetraethylene glycol and monoethyl pentaethylene glycol were obtained. Identification was as follows:

Cellosolve V: Identified by gas liquid chromatography as having the same retention time as an authentic sample. Also identified by mass spectrum and NMR spectrum.

Carbitol VI: Identified by gas liquid chromatography as having same retention time as authentic sample. Also identified by NMR spectrum and mass spectrum.

Ethyl triethylene glycol (VII): Identified by gas liquid chromatography as having same retention time as authentic sample. Also identified by NMR spectrum and mass spectrum.

Ethyl tetraethylene glycol (VIII): Identified by NMR spectrum.

Ethyl pentaethylene glycol (IX): Identified by mass spectrum.

EXAMPLE 4

A solution composed of 3 cc. of ethylene oxide, 3 cc. benzyl alcohol and 0.4 cc. of trimethyl phosphine was placed in a 10 ml. stainless steel microreactor at about +70° C., and the reactor closed and the contents mixed. The mixture was allowed to come to room temperature overnight, and was then heated to 100° C. for 3 hours then cooled. Examination of the reaction mixture by gas liquid chromatography showed the presence of benzyl Cellosolve $$C_6H_6CH_2OCH_2CH_2OH$$

and benzyl carbitol $$C_6H_6CH_2OCH_2CH_2OCH_2CH_2OH$$

both were identified as having the same retention time as authentic samples.

EXAMPLE 5

A solution composed of 27 g. 1-octadecanol (stearyl alcohol) and 10 grams of ethylene oxide and 0.5 ml. of tri-n-butyl phosphine was placed in a stainless steel reactor, mixed and then heated to 100° C. for 3 hours then cooled. The reaction mixture was found by gas liquid chromatography to contain stearyl Cellosolve $$CH_3(CH_2)_{16}CH_2OCH_2CH_2OH$$

and stearyl Carbitol $$CH_3(CH_2)_{16}CH_2OCH_2CH_2OCH_2CH_2OH$$

Both were identified as having the same retention time as authentic samples.

EXAMPLE 6

A solution composed of 4 ml. of tetrahydrofurfuryl alcohol, 4 ml. of styrene oxide and 0.5 ml. of tri-n-butyl phosphine were placed in a 10 ml. stainless steel microreactor, the reactor closed and the contents mixed. The reaction mixture was heated to 100° C. for 3 hours, then cooled. The reaction mixture was found to contain tetrahydrofurfuryl phenyl Cellosolve

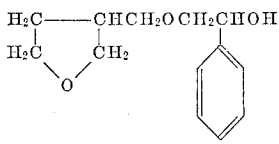

and tetrahydrofurfuryl diphenyl Carbitol

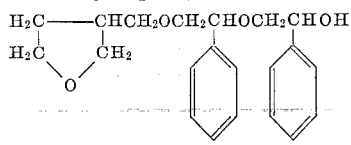

Both were identified by gas liquid chromatography as having the same retention time as authentic samples.

EXAMPLE 7

A solution composed of 6 grams of propylene oxide, 5 cc. of ethanol and 0.4 cc. of triethyl phosphine was placed in a stainless steel reactor, mixed, then heated to 100° C. for 3 hours. The resulting reaction mixture was found to contain propylene glycol mono ethyl ether $$C_2H_5OCH_2CH(OH)CH_3$$

and dipropylene glycol mono ethyl ether $$C_2H_5OCH_2CH(CH_3)OCH_2CH(OH)CH_3$$

Both were identified by gas liquid chromatography as having the same retention time as authentic samples.

EXAMPLE 8

A solution composed of 10 grams of cyclohexene oxide, 5 cc. of ethanol and 0.4 cc. of triisopropyl phosphine was placed in a stainless steel reactor, mixed, then heated to 100° C. for 3 hours. The resulting reaction mixture was found to contain 2-ethoxy, 2'-hydroxy dicyclohexyl ether

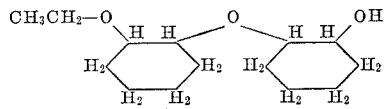

and 1-hydroxy, 2-ethoxy cyclohexane

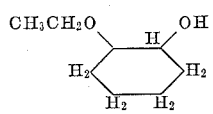

Both were identified by gas liquid chromatography as having the same retention time as authentic samples.

Having regard to the foregoing disclosure, the following is claimed as the inventive and patentable embodiments thereof:

1. A process which comprises effecting reaction of:
   (1) an epoxide selected from the group consisting of 1,2-propylene-oxide, 1,3-propylene oxide, 1,2-butylene oxide, 1,3-butylene oxide, 1,4-butylene oxide, 2,3-butylene oxide, 1,2-isobutylene oxide, 1,2-amylene oxide, 2,3-amylene oxide, 1,3-amylene oxide, 1,4-amylene oxide, 2,4-amylene oxide, 1,2-hexylene oxide, dipentene dioxide 3,4-hexylene oxide; styrene oxide, dicyclopentadiene dioxide, vinylcyclohexene dioxide, vinyl cyclohexene oxide, cyclohexene oxide, cycloheptene oxide, allyl-9,10-epoxy-stearate, methyl-9,10-epoxystearate, bromoethylene oxide, cyanoethylene oxide, 1,2-epoxy-ethyl-propionate, 3,4-epoxy-cyclohexane carbonitrile, and methyl glucoside; with
   (2) an alcohol selected from the group consisting of ethyl alcohol, methyl alcohol, isopropyl alcohol, n-butyl alcohol, n-propyl alcohol, isobutyl alcohol, tert-butyl alcohol, sec-butyl alcohol, amyl alcohol, isoamyl alcohol, heptyl alcohol, hexyl alcohol, decyl alcohol, dodecyl alcohol, stearyl alcohol; benzyl alcohol, alpha-phenethyl alcohol, beta-phenethyl alcohol, alpha-phenpropyl alcohol; allyl alcohol, crotyl alcohol, butenyl alcohol, pentenyl alcohol, oleyl alcohol, ricinoleyl alcohol, linoleyl alcohol, linolenyl alcohol; cyclohexyl alcohol, cyclopentyl alcohol, cycloheptyl alcohol; tetrahydro-furfuryl alcohol, and furfuryl alcohol; in the presence of
   (3) a phosphine catalyst selected from the group consisting of trimethyl phosphine, methyl di-n-butyl phosphine, tri-n-butyl phosphine, triisobutyl phosphine, tri - tert - butyl phosphine, trisecondarybutyl phosphine, triethyl phosphine, isopropyl diamyl phosphine, trihexyl phosphine, tridodecyl phosphine, isoamyl dibutyl phosphine, isohexyl diethyl phosphine, tri-2-ethyl phosphine, triisopropyl phosphine, di-n-propylmethyl phosphine, tricyclohexyl phosphine, methyl dicyclohexyl phosphine, diethyl-cyclohexyl phosphine, triphenyl phosphine, methyl diphenyl phosphine, dimethylphenyl phosphine, cyclohexyldiphenyl phosphine, dicyclohexylphenyl phosphine, ethylcyclopentyl phenethyl phosphine, butylcyclohexyl tolyl phosphine, and ethylcyclopentyl xylyl phosphine.

2. A process according to claim 1, in which the epoxide has a substituent on one of the oxirane carbon atoms and and oxyketone is also obtained.

3. A process according to claim 1 in which the reaction temperature is within the range from about 25° to about 250° C.

4. A process according to claim 1 in which the amount of catalyst is within the range from about 0.025% to about 10% by weight of the reaction mixture, and the ratio of epoxide: alcohol is with the range from about 0.1:1 to about 10:1.

5. A process according to claim 1 in which the reaction is effected under an inert atmosphere.

6. A process which comprises effecting reaction of ethylene oxide with ethanol in the presence of tributyl phosphine.

7. A process which comprises effecting reaction of:
   (1) an epoxide selected from the group consisting of:
      (a) ethylene oxide and ethylene oxide substituted by a member selected from the group consisting of bromo, cyano and phenyl radicals,
      (b) alkylene monoepoxides having three to six carbon atoms,
      (c) monoepoxy esters of stearic and propionic acids,
      (d) dipentene dioxide,
      (e) dicyclopentadiene dioxide,
      (f) vinylcyclohexene dioxide,
      (g) cyclohexene oxide,
      (h) cycloheptene oxide,
      (i) 3,4-epoxy-cyclohexane carbonitrile, and
      (j) methyl glucoside; with
   (2) an alcohol having the formula ROH wherein R is selected from the group consisting of:
      (a) alkyl radicals having from one to eighteen carbon atoms,
      (b) cycloalkyl radicals having from five to seven carbon atoms,
      (c) phenalkyl radicals wherein the alkyl group has one to three carbon atoms,
      (d) alkenyl radicals having three to eighteen carbon atoms,
      (e) ricinoleyl radical, and
      (f) furfuryl radicals; in the presence of
   (3) a trihydrocarbyl phosphine catalyst having the formula $R_1R_2R_3P$ in which $R_1, R_2$, and $R_3$ are selected from the group consisting of:
      (a) alkyl radicals having from one to twelve carbon atoms,
      (b) cycloalkyl radicals having five or six carbon atoms,
      (c) phenyl radicals, (d) tolyl radicals,
(e) xylyl radicals, and
(f) phenethyl radicals.

References Cited

Strevli, Chemical Abstracts 54, 20429f (1960).
Drew et al., Chemical Abstracts 53, 213f (1959).
Brewis et al., Chemical Abstracts 62, 13037f (1965).
Pracejus et al., Chemical Abstracts 64, 17374e (1966).
Chemical Abstracts Index of vol. 64 (1966), p. 2574s.

DANIEL D. HORWITZ, Primary Examiner

U.S. Cl. X.R.

260—590, 611, 398, 465.6, 484, 464, 347.8; 252—73, 364, 351; 106—38.22